Oct. 13, 1936.  C. C. VAN NUYS  2,057,459
METHOD FOR THE SEPARATION AND RECOVERY OF KRYPTON AND XENON
FROM GASEOUS MIXTURES CONTAINING THEM
Filed Feb. 26, 1936
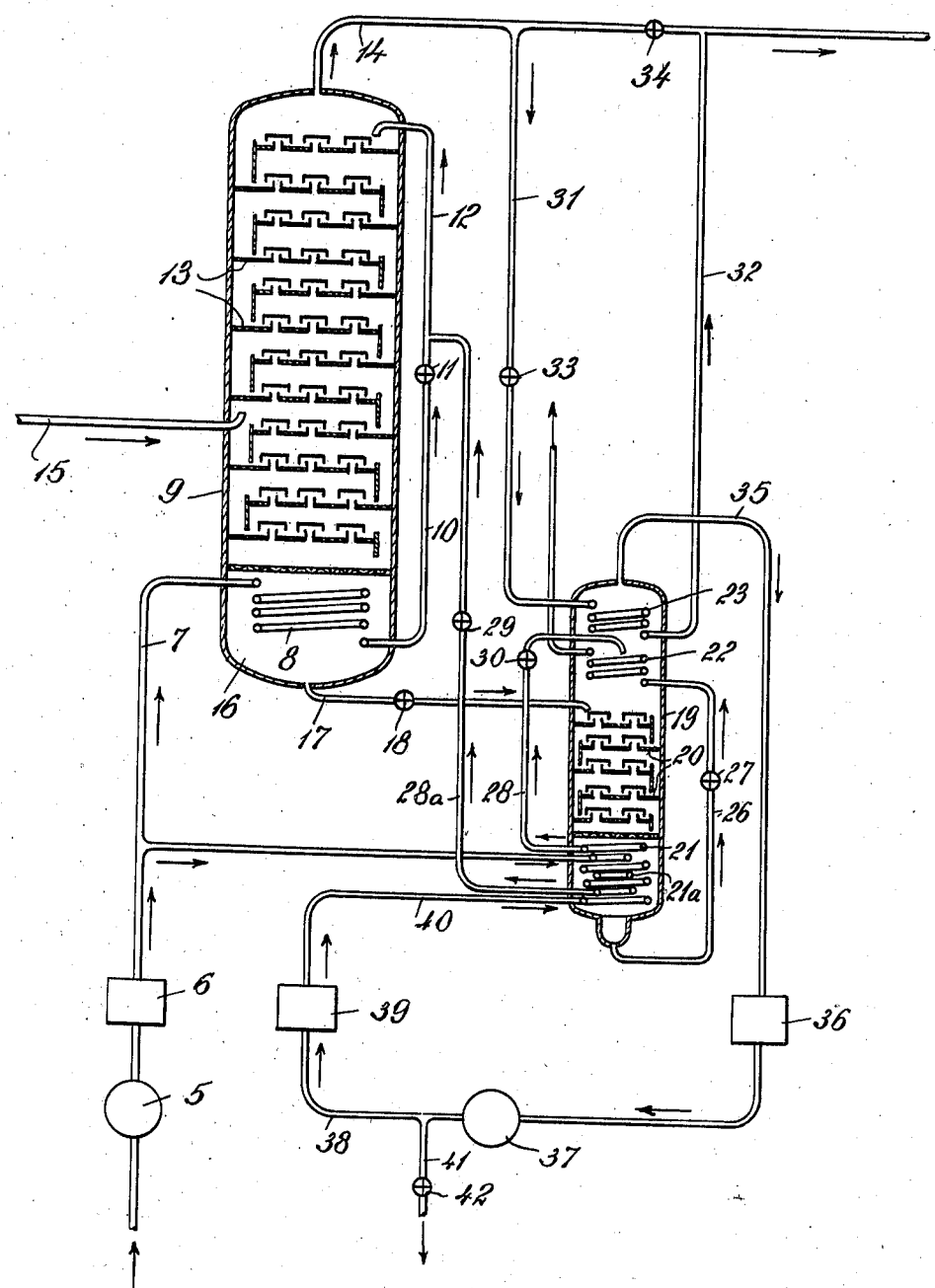
INVENTOR.
Claude C. Van Nuys
BY
Pennie Davis Marvin & Edmonds
ATTORNEYS Patented Oct. 13, 1936

2,057,459

UNITED STATES PATENT OFFICE 2,057,459

METHOD FOR THE SEPARATION AND RECOVERY OF KRYPTON AND XENON FROM GASEOUS MIXTURES CONTAINING THEM

Claude C. Van Nuys, Cranford, N. J., assignor to Air Reduction Company, Incorporated, New York, N. Y., a corporation of New York Application February 26, 1936, Serial No. 65,758

4 Claims. (Cl. 62—175.5)

This invention relates to a method and apparatus for recovering the elements krypton and xenon from gaseous mixtures containing them such as atmospheric air or atmospheric air residues from which oxygen or nitrogen or both have been more or less completely removed previously.

The invention is characterized by the important feature that the primary object is the recovery of krypton and xenon, the separation of oxygen or nitrogen being merely incidental to the procedure.

The present method has the important advantage of obtaining substantially all the krypton and xenon contained in the sum total of air treated in a very efficient manner. The method is not intended as an auxiliary to air separation methods such as are in common use today for the welding and cutting industry, but is particularly adaptable to cases where exceedingly large volumes of air are treated to obtain the krypton and xenon in quantities sufficient for new industrial applications. Limited quantities of oxygen of 95% purity or higher, even 99.6% purity, may be obtained incidentally without any important additional expense. The method may even be operated in such a manner as to recover practically all of the oxygen contained in the air treated in such manner.

Furthermore, another important feature characterizing the present invention is as follows:

First, consider the case where the recovery, except in small fractions (0.1 to 0.3) of the oxygen is not desired. In this case more especially, as hereinafter described, only a small fraction (around 0.1) of the total air treated in the system is liquefied and since this is true, the compositions of the vapors to be condensed are not greatly different from the compositions of the liquids by thermal contact with which they are condensed. The pressure necessary in order to cause such condensation is relatively small and thus the power requirements in the whole system is also very small.

If larger quantities of oxygen than those indicated above are desired, the pressure differences between vapors to be condensed and liquids by which they are condensed increases slightly, but in all cases these pressure differentials are so small that they may be produced by compressors of the turbo type. Such compressors, it is well known, are peculiarly adapted to handle exceedingly large volumes of gas such as air if the pressure differential resulting is not too great, say 5 atmospheres.

Further advantageous features of the invention may be better understood by references to the following descriptions and the accompanying diagrammatic drawing which illustrates an apparatus suitable for the operation of the invention, particularly as applied to the extraction of krypton and xenon from air.

Referring to the drawing, atmospheric air is delivered by a low pressure or turbo compressor 5 and after being cooled in the exchanger system 6 enters the separation system through pipe 7 and thence to a coil 8 located at the bottom level of a rectification column 9 wherein it is liquefied by indirect contact with the liquid collecting at the bottom of column 9. The pressure necessary to be maintained upon this air is only that required for condensation by indirect contact in coil 8 with the liquid just specified. From coil 8, the air, now in the liquid state, passes through pipe 10 and pressure reducing valve 11 wherein its pressure is lowered to that prevailing in column 9, after which it is delivered to the top of the column by means of pipe 12.

The liquid then cascades over trays 13 of the rectifier 9 while the vapor portion thereof which formed as the result of passage through expansion valve 11 joins the outgoing waste gas, principally nitrogen, leaving the rectifier through pipe 14. The column 9 is thus refluxed at the top with liquid air, the krypton and xenon therein contained being found practically wholly in the liquid portion cascading over trays 13.

At an intermediate level of column 9 a substantial quantity of unseparated, cooled air is admitted at the pressure of said column. This air is blown through the exchanger-rectification system by a blower (not shown), the pressure required being only that necessary to force it through against pipe friction, etc. The liquid air descending over trays 13 contacts directly with the air entering column 9 through pipe 15, and the krypton-xenon in the air is separated and passes downward in the liquid cascading over trays 13, and thence to the lower portion 16 of column 9.

The air liquefied in coil 8 vaporizes an equivalent portion of the liquid body collecting at the bottom of the column 9 and causes it to ascend through the column. During this ascent some of the oxygen together with all the krypton and xenon content in the total ascending vapor is liquefied and returns with the descending liquid while the residual vapor consisting of nitrogen and oxygen passes out column 9 through pipe 14.

The liquid pool collecting at the bottom of column 9 will thus contain a portion of the oxygen and substantially all of the krypton and xenon contained in the two streams of air admitted into the column. A portion of this liquid is continuously withdrawn through pipe 17 controlled by valve 18 and is delivered to an intermediate level of an auxiliary rectifier 19. It is in rectifier 19 that the oxygen contained in the liquid passing through valve 18 is finally separated from the xenon-krypton concentrate accumulated in the column 9. The liquid mixture entering rectifier 19 cascades over trays 20 and collects, together with liquid descending from above the level of admission, at the bottom where it submerges coils 21 and 21a.

The fluids circulating through coils 21 and 21a evaporate a portion of the liquid collecting at the bottom of rectifier 19 and this vapor ascending the rectifier 19 loses substantially all of its contained krypton and xenon by direct contact with the descending liquid which thus becomes concentrated in krypton and xenon. The liquid descending from above in the rectifier 19 is produced partly by condensers 22 and 23 and is partly constituted by the liquid entering the top of rectifier 19 through valve 30, this latter liquid being obtained in a manner about to be described.

The liquid passing through pipe 26 and expansion valve 27 to condenser 22 constitutes the krypton-xenon concentrate in its final form, being evaporated in coil 22 by producing its equivalent quantity of liquid in the ascending vapors in rectifier 19. This condensation and evaporation is advantageously regulated and controlled by means of a suitable vacuum pump after the vapor leaving condenser 22 has passed through the exchanger system and has been warmed up to atmospheric temperature. The oxygen product from which the krypton and xenon has been separated and which has been condensed in coil 21 passes through pipe 28 to the expansion valve 30.

In order to evaporate at the bottom of rectifier 19 an amount of liquid equivalent to that entering the rectifier through valve 18, a portion of the incoming compressed air after passing the exchanger system is diverted to the coil 21a located at the bottom of rectifier 19. An amount of liquid air equivalent to the liquid feed of rectifier 19 is thus produced in the coil 21a and this liquid leaves rectifier 19 through pipe 28a and expansion valve 29 and is added to the liquid air passing through valve 11 of the column 9 and together with that liquid enters the top level of the column. By manipulation of valves 27, 29 and 30, steady conditions with a constant amount of evaporation and condensation are maintained in rectifier 19.

Thus far in the description it will be noted that all fluids condensed are liquefied by indirect contact with liquids already formed and thus each liquid condensation is produced by evaporating an equivalent quantity of liquid in the system. In practically all air separation systems it is desirable, in order to overcome the loss of liquid due to heat leak, to supply a definite quantity of liquid which has been produced by indirect contact with exceedingly cold vapors derived, it may be, from an expansion engine or other heat removing device. It is advantageous, however, to so arrange the apparatus in which the present method is carried out that all or a portion of the make-up liquid produced by condensation of vapors by indirect contact with colder vapors shall further the separation while undergoing condensation, for example, I have shown in the diagram a portion of the cold outgoing nitrogen waste product passing through a coil 23 located at the top level of rectifier 19. This vapor passing through coil 23 has the lowest temperature in the whole system and may advantageously be employed to produce some make-up liquid in the oxygen-krypton-xenon cycle as shown. The quantity of cold gas passing through coil 23 may be regulated by means of pipes 31 and 32 and valves 33 and 34.

The oxygen effluent is withdrawn through a pipe 35 from the top of the rectifier 19 and after passing through an exchanger 36 is compressed by a turbo-blower or equivalent compressor 37. It is delivered through a pipe 38 to an exchanger 39 and thence through a pipe 40 to the coil 21. A portion of the oxygen can be withdrawn through the pipe and valve 42.

The compressor-exchanger system, necessary in order that the various operations constituting the method of the application may be carried out, is similar to that commonly used in the liquefaction of gases and is not, therefore, illustrated in detail.

The method and apparatus as described facilitate the handling of the relatively enormous volume of air which must be treated necessarily to recover krypton and xenon in quantities which would make these gases available for extended commercial adaptations. As indicated herein, oxygen may be recovered incidentally in a form desirable for commercial purposes, but such recovery is not the primary object of the invention.

Various changes may be made in the details of procedure and in the apparatus without departing from the invention or sacrificing the advantages thereof.

I claim:

1. The method of separating and recovering krypton and xenon from air which comprises liquefying a portion of the air to be treated, washing a substantially larger volume of air with the liquid air to produce a liquid concentrate containing krypton and xenon in proportions exceeding those present in liquid air, rectifying the liquid concentrate to further enrich the liquid in krypton and xenon, and maintaining the low temperature for the rectification by re-liquefying the effluent therefrom and returning the liquid to the rectification zone.

2. The method of separating and recovering krypton and xenon from air which comprises liquefying a portion of the air to be treated, washing a substantially larger volume of air with the liquid air to produce a liquid concentrate containing krypton and xenon in proportions exceeding those present in liquid air, rectifying the liquid concentrate to further enrich the liquid in krypton and xenon and maintaining the low temperature for the rectification by compressing and liquefying the effluent therefrom and returning the liquid to the rectification zone.

3. The method of separating and recovering krypton and xenon from air which comprises liquefying a portion of the air to be treated, washing a substantially larger volume of air with the liquid air to produce a liquid concentrate containing krypton and xenon in proportions exceeding those present in liquid air, rectifying the liquid concentrate to further enrich the liquid in krypton and xenon and maintaining the low temperature for the rectification by re-liquefying the effluent in heat exchange with the liquid concentrate and returning the liquid to the rectification zone.

4. The method of separating and recovering krypton and xenon from air which comprises liquefying a portion of the air to be treated, washing a substantially larger volume of air with the liquid air to produce a liquid concentrate containing krypton and xenon in proportions exceeding those present in liquid air, rectifying the liquid concentrate to further enrich the liquid in krypton and xenon and maintaining the low temperature for the rectification by compressing and liquefying the effluent therefrom in heat exchange with the liquid concentrate and returning the liquid to the rectification zone.

CLAUDE C. VAN NUYS.